US012809897B2

(12) United States Patent
Istomin et al.

(10) Patent No.: US 12,809,897 B2
(45) Date of Patent: Nov. 24, 2026

(54) SYSTEMS AND METHODS FOR MANAGING CONFLICTING STATEMENTS IN A KNOWLEDGE DATABASE BASED ON USER QUERIES

(71) Applicants: Constructor Technology AG, Schaffhausen (CH); Constructor Education and Research Genossenschaft, Schaffhausen (CH)

(72) Inventors: Dmitrii Istomin, Singapore (SG); Alexander Tormasov, Bremen (DE); Laurent Dedenis, Geneva (CH); Stanislav Protasov, Singapore (SG); Serg Bell, Singapore (SG); Nikolay Dobrovolskiy, Alanya (TR)

(73) Assignee: Constructor Technology AG, Schaffhausen (CH)

( * ) Notice: Subject to any disclaimer, the term of this patent is extended or adjusted under 35 U.S.C. 154(b) by 0 days.

(21) Appl. No.: 19/192,780

(22) Filed: Apr. 29, 2025

(65) Prior Publication Data

US 2026/0340007 A1 Oct. 29, 2026

(51) Int. Cl.
*G06F 16/334* (2025.01)
*G06F 16/23* (2019.01)
*G06F 40/30* (2020.01)

(52) U.S. Cl.
CPC ........ *G06F 16/334* (2019.01); *G06F 16/2365* (2019.01); *G06F 40/30* (2020.01)

(58) Field of Classification Search
CPC ..... G06F 16/334; G06F 16/2365; G06F 40/30
USPC .......................................................... 707/748
See application file for complete search history.

(56) References Cited

U.S. PATENT DOCUMENTS 12,632,517 B2 * 5/2026 Horton .................. G06F 21/106
2018/0293393 A1 * 10/2018 Effendi .................... G06F 21/32
2019/0295101 A1 * 9/2019 Porter ................. G06F 16/2365
2020/0175032 A1 * 6/2020 Gibson ................. G06F 16/258
2024/0045855 A1 * 2/2024 Kondakindi ........ G06F 16/2365
2025/0061307 A1 * 2/2025 Tran ....................... G06N 3/045

* cited by examiner

*Primary Examiner* — Hanh B Thai
(74) *Attorney, Agent, or Firm* — ArentFox Schiff LLP; Michael Fainberg

(57) ABSTRACT

A system verifies a plurality of documents in the knowledge database by determining verification information comprising at least one of a source identifier and a creation time of each respective document of the plurality of documents. The system stores the verification information in the knowledge database. The system receives a user query for the machine learning model and identifies, in the knowledge database, two or more statements related to the user query. In response to detecting conflicting factual data in the two or more statements, the system assigns a respective comprehension level to each of the two or more statements based at least on respective verification information associated with each of the documents. The system provides at least the conflicting factual data and the respective comprehension level of each of the two or more statements to the machine learning model for generating a user query response.

21 Claims, 7 Drawing Sheets

200

300

400

SYSTEMS AND METHODS FOR MANAGING CONFLICTING STATEMENTS IN A KNOWLEDGE DATABASE BASED ON USER QUERIES

FIELD OF TECHNOLOGY

The present disclosure relates to the field of machine learning, and, more specifically, to systems and methods for managing conflicting statements in a knowledge database based on user queries.

BACKGROUND

Knowledge models are a fundamental component of machine learning systems, designed to encapsulate and utilize structured information to enhance decision-making processes. These models are built upon vast datasets and are trained to recognize patterns, make predictions, and provide insights across various domains.

Despite their capabilities, knowledge models face challenges related to the timeliness and consistency of the information they contain. For example, as the world evolves, the data that knowledge models are based on can become obsolete. This is particularly evident in rapidly changing fields like technology and medicine, where new discoveries and innovations can render previous knowledge irrelevant.

Knowledge models may further encounter conflicting information, especially when sourced from diverse datasets. This can lead to inconsistencies in decision-making and predictions. Resolving these conflicts requires sophisticated algorithms capable of evaluating the credibility and context of the information, as well as mechanisms to prioritize more reliable sources.

SUMMARY

The present disclosure outlines systems and methods for managing and verifying information within a knowledge model through structured steps to ensure accuracy and reliability. It begins with uploading documents as foundational data for analysis and verification. Next, verification information is assigned by categorizing documents as governmental, corporate, opinion-based, medical, etc., and recording the document's date and creator, assessed by an expert or language model (LLM). A knowledge graph or Retrieval-Augmented Generation (RAG) is then created, incorporating source information and verification levels to organize and retrieve knowledge systematically. The method identifies and compares facts within the graphs, detecting conflicts where facts about the same object differ. For each conflict, a comprehension level is defined by evaluating the source's verification, document dates, and agent opinions. Based on this, low-confidence facts are either adjusted to align with high-confidence facts or supplemented by them, ensuring the knowledge model remains robust and reliable.

In one exemplary aspect, the techniques described herein relate to a method for managing conflicting statements in a knowledge database utilized by a machine learning model for responding to user queries, the method including: verifying a plurality of documents in the knowledge database by determining verification information including at least one of a source identifier and a creation time of each respective document of the plurality of documents; storing the verification information in the knowledge database; receiving a user query for the machine learning model; identifying, in the knowledge database, two or more statements related to the user query; in response to detecting conflicting factual data in the two or more statements, assigning a respective comprehension level to each of the two or more statements based at least on respective verification information associated with each document corresponding to the two or more statements; and providing at least the conflicting factual data and the respective comprehension level of each of the two or more statements to the machine learning model for generating a response to the user query.

In some aspects, the techniques described herein relate to a method, wherein the machine learning model is included in a large language model (LLM) service.

In some aspects, the techniques described herein relate to a method, wherein the knowledge database is one of: a Retrieval-Augmented Generation (RAG) database, a knowledge graph, an education platform.

In some aspects, the techniques described herein relate to a method, wherein detecting the conflicting factual data includes executing a conflict-checking machine learning model configured to compare two or more information values about a matching concept and determine that the two or more information values do not correspond.

In some aspects, the techniques described herein relate to a method, wherein assigning the respective comprehension level to each of the two or more statements includes executing a confidence-evaluating machine learning model configured to generate a comprehension level based on input verification information of a given document.

In some aspects, the techniques described herein relate to a method, wherein the response further describes the two or more statements and the respective verification information associated with each document corresponding to the two or more statements, and provides an indication that the two or more statements provide conflicting factual data for the user query.

In some aspects, the techniques described herein relate to a method, further including adjusting the knowledge database based on a comparison of the respective comprehension level of each of the two or more statements.

In some aspects, the techniques described herein relate to a method, wherein a first comprehension level is assigned to a first statement providing a first information value of the conflicting factual data, and a second comprehension level is assigned to a second statement providing a second information value of the conflicting factual data, wherein adjusting the knowledge database further includes: in response to determining that the first comprehension level is greater than the second comprehension level, replacing the second information value with the first information value.

In some aspects, the techniques described herein relate to a method, wherein a first comprehension level is assigned to a first statement providing a first information value of the conflicting factual data, and a second comprehension level is assigned to a second statement providing a second information value of the conflicting factual data, wherein adjusting the knowledge database further includes: in response to determining that the first comprehension level is greater than the second comprehension level, modifying the second information value to include the first information value.

In some aspects, the techniques described herein relate to a method, further including: receiving a new document for inclusion in the knowledge database; assigning new verification information to the new document; identifying a plurality of information values in the new document; in response to detecting a conflict between at least one of the plurality of information values and an existing information value in the knowledge database, determining and comparing respective comprehension levels of the new document and a source document of the existing information value; and adjusting the knowledge database based on a comparison of the respective comprehension levels.

In some aspects, the techniques described herein relate to a method, wherein a given comprehension level is associated with the creation time such that more recently created documents are deemed more reliable than older created documents.

In some aspects, the techniques described herein relate to a method, wherein the verification information further includes an external opinion generated by one or more of: a large language model, an expert, a third-party entity that performs fact checks.

It should be noted that the methods described above may be implemented in a system comprising at least one hardware processor and memory. Alternatively, the methods may be implemented using computer executable instructions of a non-transitory computer readable medium.

In some aspects, the techniques described herein relate to a system for managing conflicting statements in a knowledge database utilized by a machine learning model for responding to user queries, including: at least one memory; at least one hardware processor coupled with the at least one memory and configured, individually or in combination, to: verify a plurality of documents in the knowledge database by determining verification information including at least one of a source identifier and a creation time of each respective document of the plurality of documents; store the verification information in the knowledge database; receive a user query for the machine learning model; identify, in the knowledge database, two or more statements related to the user query; in response to detecting conflicting factual data in the two or more statements, assign a respective comprehension level to each of the two or more statements based at least on respective verification information associated with each document corresponding to the two or more statements; and provide at least the conflicting factual data and the respective comprehension level of each of the two or more statements to the machine learning model for generating a response to the user query.

In some aspects, the techniques described herein relate to a non-transitory computer readable medium storing thereon computer executable instructions for managing conflicting statements in a knowledge database utilized by a machine learning model for responding to user queries, including instructions for: verifying a plurality of documents in the knowledge database by determining verification information including at least one of a source identifier and a creation time of each respective document of the plurality of documents; storing the verification information in the knowledge database; receiving a user query for the machine learning model; identifying, in the knowledge database, two or more statements related to the user query; in response to detecting conflicting factual data in the two or more statements, assigning a respective comprehension level to each of the two or more statements based at least on respective verification information associated with each document corresponding to the two or more statements; and providing at least the conflicting factual data and the respective comprehension level of each of the two or more statements to the machine learning model for generating a response to the user query.

In some aspects, the techniques described herein relate to a method for managing conflicting statements in a knowledge database utilized by a machine learning model for responding to user queries, the method including: generating the knowledge database using a plurality of documents; verifying the plurality of documents in the knowledge database by determining verification information including at least one of a source identifier and a creation time of each respective document of the plurality of documents; detecting conflicting factual data in two or more statements of the knowledge database; in response to detecting the conflicting factual data, assigning a respective comprehension level to each of the two or more statements based at least on respective verification information associated with each document corresponding to the two or more statements; and adjusting the knowledge database based on a comparison of the respective comprehension level of each of the two or more statements.

In some aspects, the techniques described herein relate to a method, further including: rebuilding the knowledge database and all connections in the knowledge database in response to receiving, for addition in the knowledge database, a high-priority document with updated facts.

In some aspects, the techniques described herein relate to a method, further including: executing the machine learning model to generate responses to user queries based on the adjusted knowledge database.

In some aspects, the techniques described herein relate to a method, wherein the machine learning model is included in a large language model (LLM) service.

In some aspects, the techniques described herein relate to a method, wherein the knowledge database is one of: a Retrieval-Augmented Generation (RAG) database, a knowledge graph, an education platform.

In some aspects, the techniques described herein relate to a method, wherein detecting the conflicting factual data includes executing a conflict-checking machine learning model configured to compare two or more information values about a matching concept and determine that the two or more information values do not correspond.

In some aspects, the techniques described herein relate to a method, wherein assigning the respective comprehension level to each of the two or more statements includes executing a confidence-evaluating machine learning model configured to generate a comprehension level based on input verification information of a given document.

In some aspects, the techniques described herein relate to a method, wherein a first comprehension level is assigned to a first statement providing a first information value of the conflicting factual data, and a second comprehension level is assigned to a second statement providing a second information value of the conflicting factual data, wherein adjusting the knowledge database further includes: in response to determining that the first comprehension level is greater than the second comprehension level, replacing the second information value with the first information value.

In some aspects, the techniques described herein relate to a method, wherein a first comprehension level is assigned to a first statement providing a first information value of the conflicting factual data, and a second comprehension level is assigned to a second statement providing a second information value of the conflicting factual data, wherein adjusting the knowledge database further includes: in response to determining that the first comprehension level is greater than the second comprehension level, modifying the second information value to include the first information value.

In some aspects, the techniques described herein relate to a method, further including: receiving a new document for inclusion in the knowledge database; assigning new verification information to the new document; identifying a plurality of information values in the new document; in response to detecting a conflict between at least one of the plurality of information values and an existing information value in the knowledge database, determining and comparing respective comprehension levels of the new document and a source document of the existing information value; and adjusting the knowledge database based on a comparison of the respective comprehension levels.

In some aspects, the techniques described herein relate to a method, further including: receiving a new document for inclusion in the knowledge database; assigning new verification information to the new document; identifying a plurality of information values in the new document; in response to detecting a conflict between at least one of the plurality of information values and an existing information value in the knowledge database, determining and comparing respective comprehension levels of the new document and a source document of the existing information value; and readjusting the adjusted knowledge database based on a comparison of the respective comprehension levels.

In some aspects, the techniques described herein relate to a method, wherein a given comprehension level is associated with the creation time such that more recently created documents are deemed more reliable than older created documents.

In some aspects, the techniques described herein relate to a method, wherein the verification information further includes an external opinion generated by one or more of: a large language model, an expert, a third-party entity that performs fact checks.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
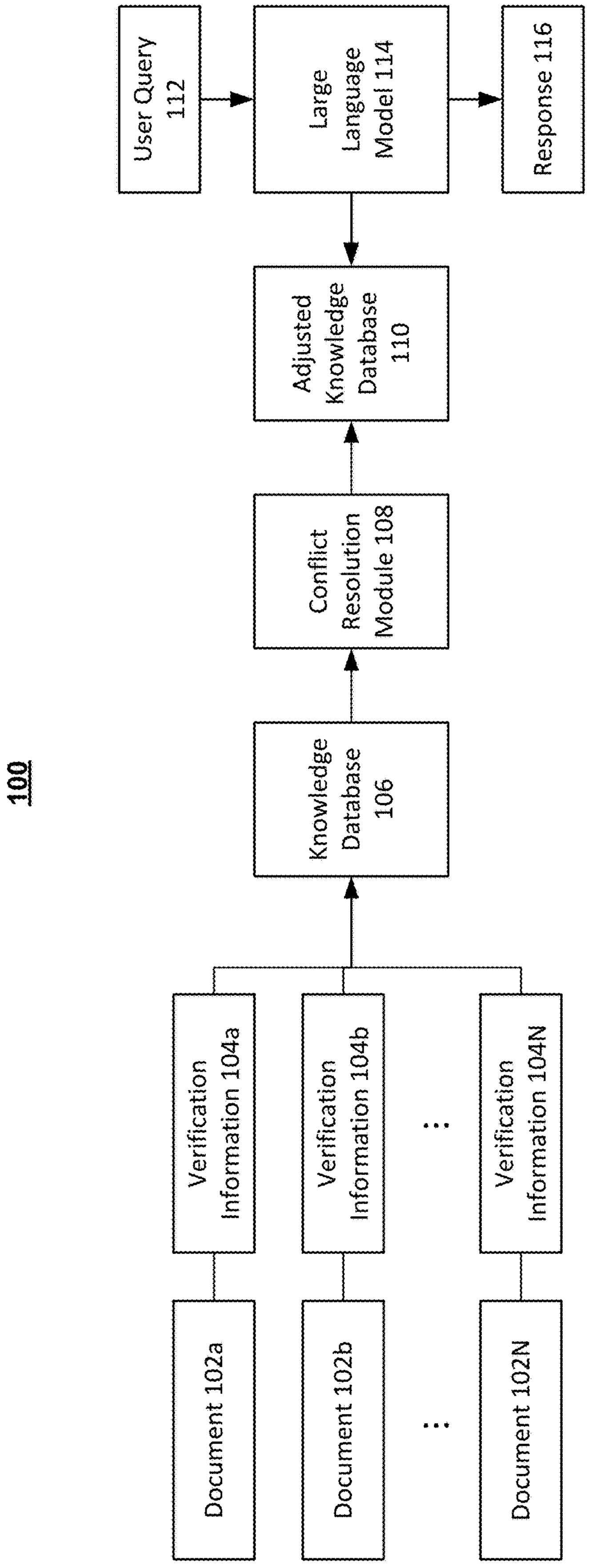
FIG. 1 is a block diagram illustrating a system for managing conflicting statements in a knowledge database.

Exemplary aspects are described herein in the context of a system, method, and computer program product for managing conflicting statements in a knowledge database based on user queries. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes systems and methods for managing and verifying information within a knowledge model. The approaches described involve several structured steps to ensure accuracy and reliability. The process begins with the uploading of documents, which serve as the foundational data input for subsequent analysis and verification stages.

Following the document upload, the next step is assigning verification information. This involves determining the level of verification for each source document and categorizing said documents in categories such as governmental, corporate, opinion-based, medical, etc. Additionally, the date of each source document and the identity of its creator are recorded. This task can be performed by either an expert or a language model (LLM), ensuring that the source's credibility is appropriately assessed.

The next step involves creating a knowledge graph (or performing Retrieval-Augmented Generation (RAG)) that includes information from the source document and the level of verification. This structured representation allows for the systematic organization and retrieval of knowledge, facilitating the identification of relationships and patterns within the data.

Subsequently, the method focuses on identifying and comparing facts within the graphs. In particular, the method involves identifying conflicts (e.g., detecting instances where facts about the same object or event have differing values). Such conflicts necessitate careful examination to ensure the integrity of the knowledge model.

For each conflicting fact, the method requires defining a level of confidence. This is achieved by evaluating the level of verification of the source document, considering the dates of the source, and incorporating the opinion of an agent (e.g., an LLM or an expert). Once the level of confidence is established, the method proceeds with two possible actions. Facts with low confidence may be adjusted in accordance with those possessing higher confidence within the graph. Alternatively, facts with low confidence may be supplemented by information from facts with higher confidence. These actions ensure that the knowledge model remains robust and reliable, reflecting the most accurate and credible information available.

FIG. 1 is a block diagram illustrating a system 100 for managing conflicting statements in a knowledge database. System 100 may be executed by computer system 20, which is described in FIG. 7. In particular, system 100 includes conflict resolution module 108, which is configured to upgrade knowledge database 106 to adjusted knowledge database 110, where the latter ultimately does not include documents with conflicting information.

In an exemplary aspect, verification information is determined for each document of knowledge database 106. For example, verification information 104*a* is determined for document 102*a*, verification information 104*b* is determined for document 102*b*, verification information 104N is determined for document 102N, etc. This involves determining the level of verification for each source document and categorizing said documents in categories such as governmental, corporate, opinion-based, medical, etc. Additionally, the date of each source document and the identity of its creator are recorded as part of the verification information.

Knowledge database 106 is utilized by large language model 114 to generate response 116 for user query 112.

In one approach, conflict resolution module 108 triggers a conflict check in response to a user query 112. In this approach, documents related to user query 112 are first identified and then conflict checks are performed in real-time. In another approach, conflict resolution module 108 triggers a conflict check whenever a document is added to knowledge database 106. In this approach, conflict resolution module 108 may also perform conflict checks at the time when knowledge database 106 is first created.

In both approaches, conflict resolution module 108 utilizes verification information to evaluate documents and determine which information value in the confliction information is to be outputted in response 116.

For example, consider a scenario where a user query 112 asks for the current population of a specific city. The knowledge database 106 may include multiple documents with varying population figures due to different publication dates or sources. The conflict resolution module 108 identifies these discrepancies and uses the most recent and reliable data to adjust the information values, ensuring that the large language model 114 provides an accurate response. In another instance, a user may inquire about the side effects of a particular medication. The database could have conflicting information from different medical studies. The conflict resolution module evaluates the credibility of each source using the associated verification information-prioritizing peer-reviewed studies over anecdotal reports, to deliver a conflict-resolved response that accurately reflects the consensus in the medical community.

Figure 2:
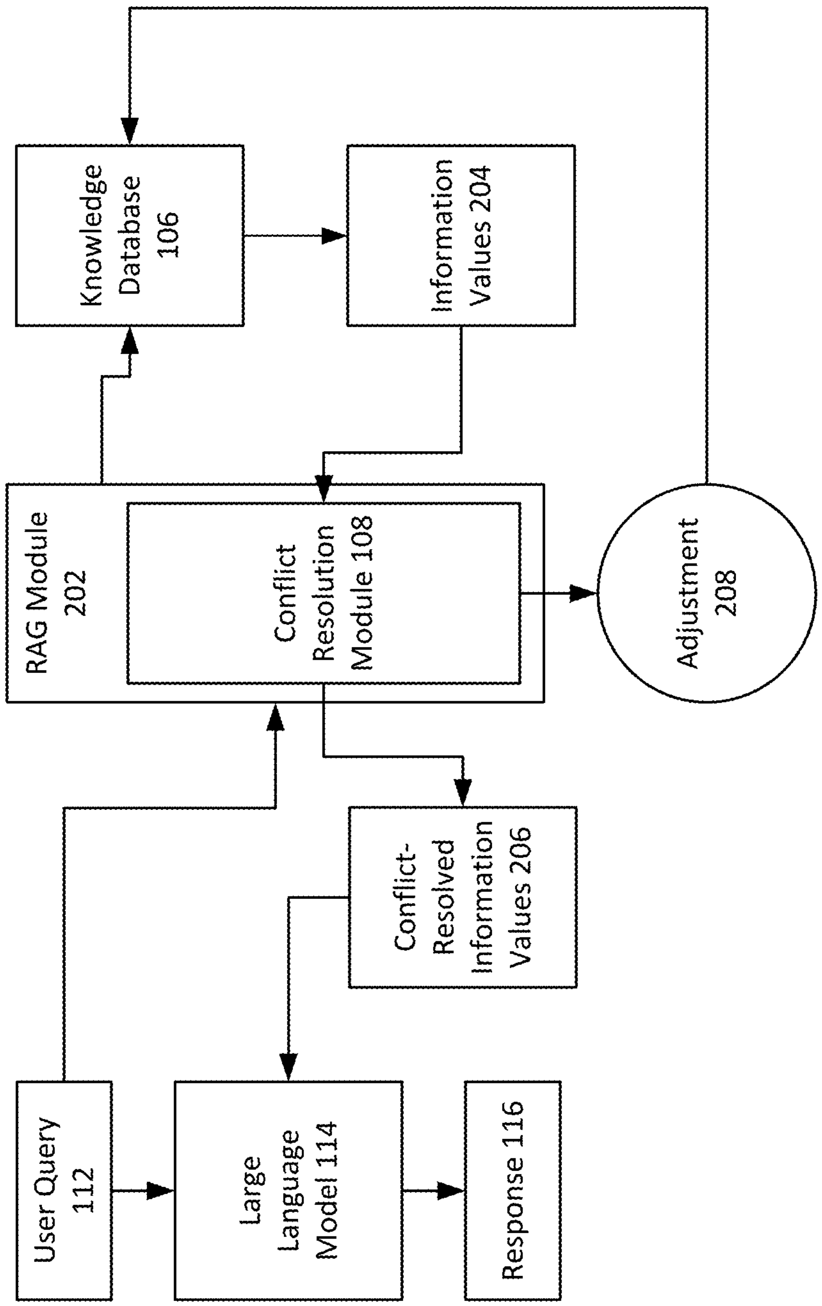
FIG. 2 is a diagram illustrating a system for generating conflict-resolved information.

FIG. 2 is a diagram illustrating a system 200 for generating conflict-resolved information. In system 200, conflict resolution module 108 is a part of RAG module 202. Suppose that large language model 114 receives user query 112 and that large language model 114 uses RAG to generate responses. Accordingly, RAG module 202 receives user query 112 as well and accesses knowledge database 106 to identify information values 204 that may be needed for large language model 114 to generate response 116. In an exemplary aspect, conflict resolution module 108 may perform a conflict check on information values 204. Suppose that information values 204 include conflicting information that will cause response 116 to be insufficient, illogical, and/or false. Conflict resolution module 108 may perform adjustment 208 on knowledge database 106 such that conflict-resolved information values 206 are generated using the adjusted knowledge database. Conflict-resolved information values 206 are then passed to large language model 114 to generate response 116.

In this context, RAG module 202 acts as an intermediary that bridges the gap between the user query and the knowledge database. When a user query 112 is received, the RAG module 202 retrieves relevant information values 204 from the knowledge database 106 that are necessary for generating a comprehensive response. In a more technical sense, the RAG framework enhances the LLM 114's capabilities by appending additional context to the user query, thereby enriching the input data that the LLM processes. This is achieved through a two-step process: retrieval and augmentation. Initially, when a user query 112 is received, the RAG module 202 retrieves a set of relevant documents or information values 204 from the knowledge database 106. These retrieved pieces of information are not simply appended as raw data; instead, they are carefully selected and structured to provide the most pertinent context that aligns with the user's query.

For example, if a user asks about the impact of climate change on animal populations, the RAG module 202 may retrieve recent scientific studies, climate data, and conservation reports. This information is then synthesized to form a coherent context (i.e., conflict-resolved information values 206) that is appended to the original query. The augmented query, now enriched with detailed background information, is fed into the LLM 114. This additional context allows the LLM 114 to generate responses that are not only more accurate but also more nuanced, as it can draw upon a broader base of knowledge. The augmentation process effectively transforms the LLM's input from a simple query into a substantive query of interconnected data points, enabling the model to produce responses that are informed by the latest research and comprehensive insights.

Figure 3:
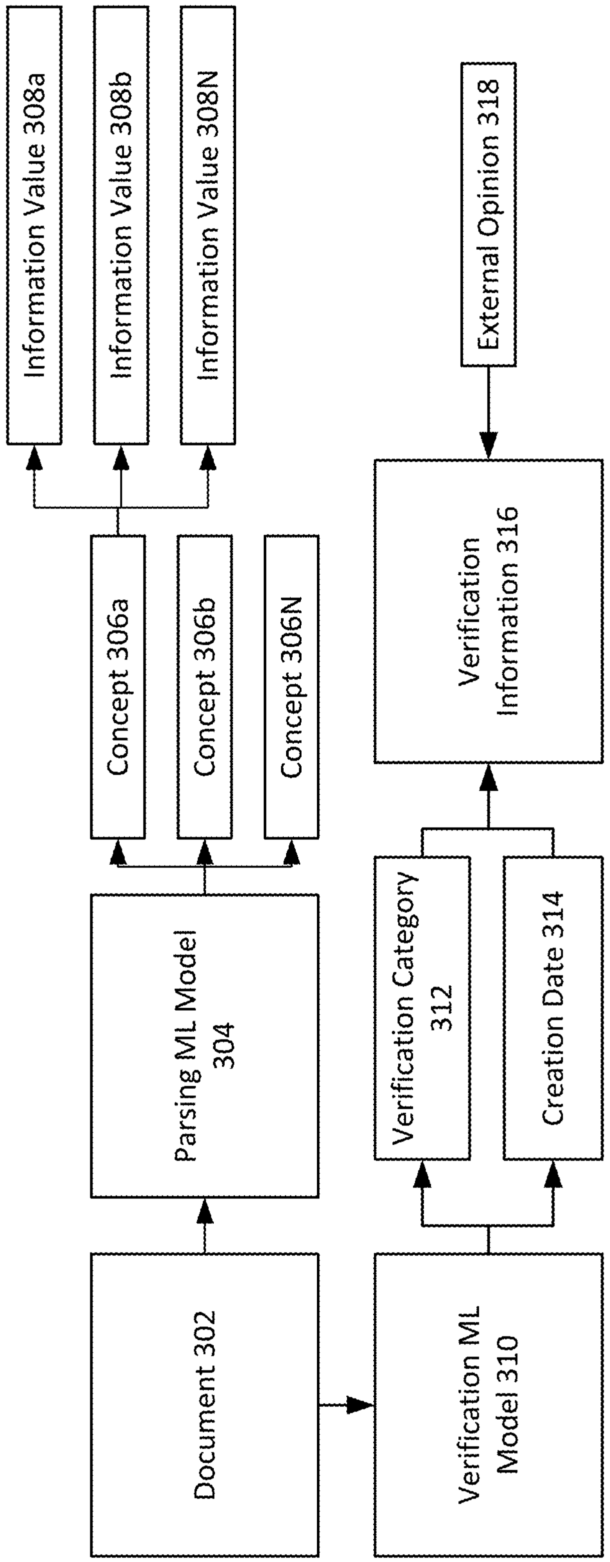
FIG. 3 is a diagram illustrating a system for parsing documents and generating verification information.

FIG. 3 is a diagram illustrating a system 300 for parsing documents and generating verification information. Consider document 302 (e.g., same as document 102*a*) is being added to knowledge database 106. In some aspects, document 302 is first provided to parsing ML model 304, which identifies a plurality of concepts 306*a*, 306*b*, . . . , 306N in document 302. Each concept is further assigned information values from document 302. For example, concept 306*a* covers information value 308*a*, information value 308*b*, . . . , information value 308N.

Document 302 is further input into verification ML model 310, which may identify a verification category 312 of document 302 and creation date 314. Both of these values are part of verification information 316. In some aspects, verification information 316 may further include external opinion 318, which provides insight by experts or reviews by users regarding the accuracy/reliability of document 302.

For instance, consider a scenario where document 302 is a research paper on the effects of a new drug. The parsing ML model 304 identifies key concepts such as "clinical trials," "side effects," and "dosage recommendations," each associated with specific information values extracted from the document. These concepts are then used to categorize the document under a verification category 312, such as "medical research," and the creation date 314 is recorded. Additionally, the verification ML model 310 may incorporate external opinions 318 by analyzing peer reviews or expert commentary on the research paper, thereby enhancing the document's verification information 316.

In another example, if document 302 is a government report on economic forecasts, the parsing ML model 304 may extract concepts like "GDP growth," "unemployment rates," and "inflation trends." The verification ML model 310 may categorize it as "governmental data" and may include external opinions from economic analysts to assess its reliability. These processes ensure that each document added to the knowledge database 106 is thoroughly analyzed and verified, providing a robust foundation for accurate information retrieval and conflict resolution.

Figure 4:
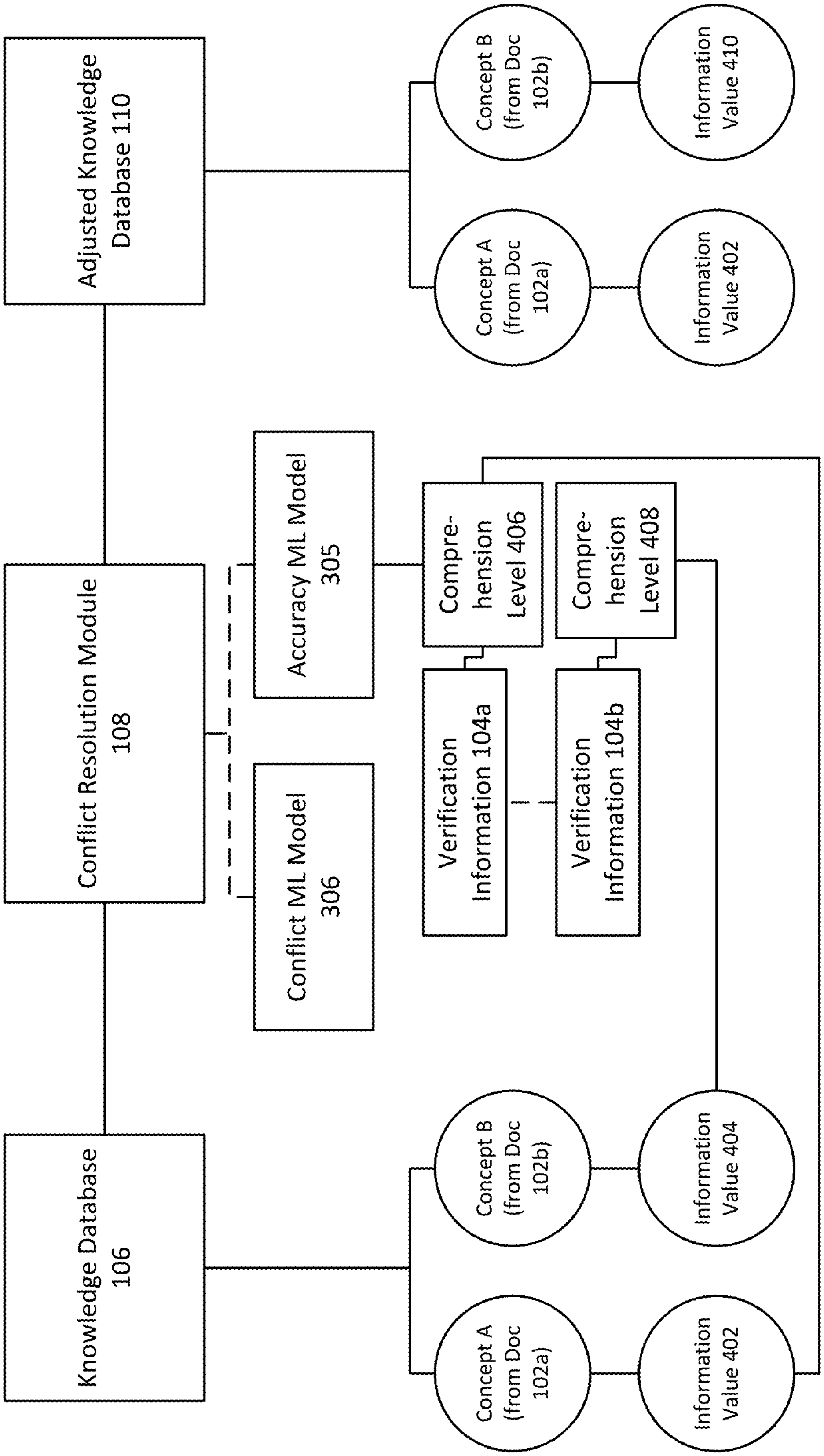
FIG. 4 is a diagram illustrating a system for generating an adjusted knowledge database.

FIG. 4 is a diagram illustrating a system 400 for generating an adjusted knowledge database. System 400 includes knowledge database 106, which includes a plurality of documents. Each document may be split into concepts and their associated information values. For example, system 400 showcases knowledge database 106 holding concept A from document 102*a* and concept B from document 102*b*. Concept A is linked with information value 402 and concept B is linked with information value 404.

Conflict resolution module 108 includes conflict ML model 306 that detects conflicts in information values and accuracy ML model 305 that determines which information value to trust from the conflicting information values. In particular, accuracy ML model 305 uses the verification information of both documents from which the conflicting information values originate, to generate comprehension levels. For example, for a statement in document 102*a*, accuracy ML model 305 utilizes verification information 104*a* to generate comprehension level 406 and, for a statement in document 102*b*, accuracy ML model 305 utilizes verification information 104*b* to generate comprehension level 408.

Based on the comparison of comprehension level 406 and comprehension level 408, conflict resolution module 108 generates adjusted knowledge database 110. Suppose that information value 404 is inaccurate. Conflict resolution module 108 may detect the inaccuracy by determining that the comprehension level 408 is lower than a threshold comprehension level and/or by determining that comprehension level 408 is less than comprehension level 406. In response to detecting the inaccuracy, conflict resolution module 108 may modify information value 404 to correspond to information value 402. The modified version of information value 404 is information value 410, which is linked by conflict resolution module 108 to concept B in adjusted knowledge database 110.

For example, consider a scenario where the knowledge database 106 includes two documents: one from a reputable scientific journal (document 102*a*) and another from a less reliable blog post (document 102*b*), both discussing the effects of a specific diet on heart health. Document 102*a*, linked with concept A, provides an information value 402 based on peer-reviewed research, while document 102*b*, linked with concept B, offers an information value 404 based on anecdotal evidence. The conflict ML model 306 identifies a discrepancy between these information values. The accuracy ML model 305 then evaluates the verification information, assigning a higher comprehension level 406 to one or more statements of the scientific journal due to its rigorous review process and a lower comprehension level 408 to one or more statements of the blog post. Consequently, the conflict resolution module 108 adjusts the knowledge database by replacing the less reliable information value 404 with the more credible information value 402, resulting in an updated information value 410. This ensures that the adjusted knowledge database 110 reflects the most accurate and trustworthy information, enhancing the reliability of responses generated by the system. In another instance, if two documents provide conflicting historical dates for a significant event, the system would prioritize the document with higher verification scores, such as one authored by a recognized historian, to ensure the adjusted database maintains historical accuracy.

Figure 5:
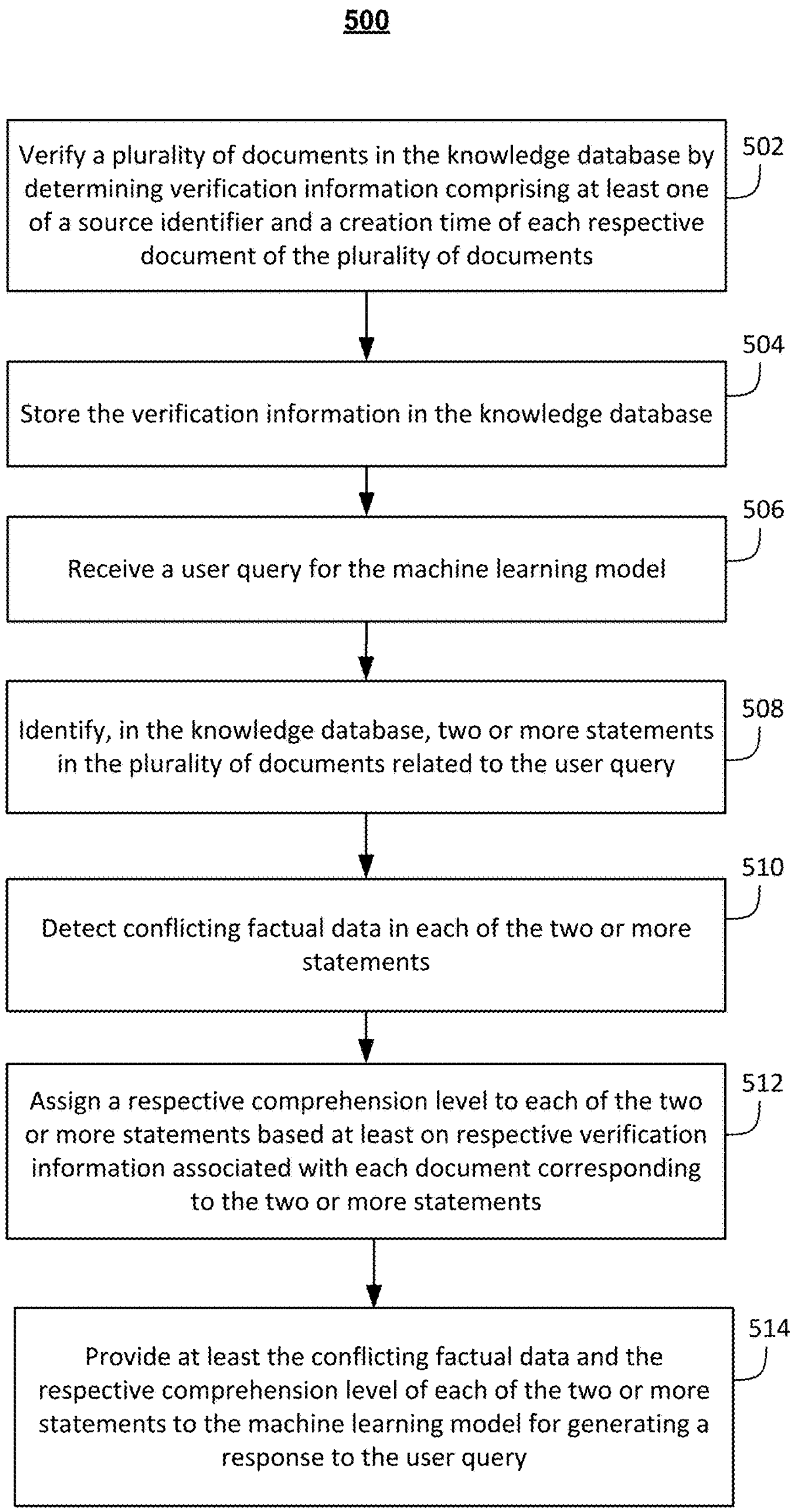
FIG. 5 illustrates a flow diagram of a method for managing conflicting statements in a knowledge database based on user queries.

FIG. 5 is a flow diagram illustrating method 500 for managing conflicting statements in a knowledge database utilized by a machine learning model for responding to user queries. In some aspects, the machine learning model is comprised in a large language model (LLM) service.

At 502, conflict resolution module 108 verifies a plurality of documents (e.g., document 102*a*, 102*b*, etc.) in the knowledge database (e.g., database 106) by determining verification information (e.g., verification information 104*a*, 104*b*, etc., respectively) comprising at least one of a source identifier and a creation time of each respective document of the plurality of documents. In some aspects, the knowledge database is one of: a Retrieval-Augmented Generation (RAG) database, a knowledge graph, an education platform.

In some aspects, verification information includes metadata such as a source identifier, which uniquely identifies the origin of the document, and a creation time, which provides a temporal context for the information contained within. For example, document 102*a* may be a scientific article published in a peer-reviewed journal, identified by its DOI (Digital Object Identifier) as the source identifier, and its publication date as the creation time. Document 102*b*, on the other hand, may be a news article from an online media outlet, with its URL serving as the source identifier and the date of publication as the creation time.

In some aspects, the verification information may include additional information such as a verification category (e.g., medical record, governmental data, blog, etc.). More specifically, each document may be assigned a verification category by conflict resolution module 108 based on its source and content type, which directly influences its perceived reliability. For instance, a document categorized as "medical record" may originate from a hospital's database or a peer-reviewed medical journal, inherently carrying a high level of credibility due to the rigorous standards and verification processes involved in medical documentation. Conversely, a document categorized as "blog" may be sourced from a personal or informal online platform, typically assigned a lower credibility level due to the lack of formal review or oversight. These categories influence comprehension levels generated by conflict resolution module 108, as they provide a structured framework for evaluating the trustworthiness of information. For example, when resolving conflicts between two or more statements in two or more documents, conflict resolution module 108 may prioritize data from a "governmental data" category over a "news article" category, assuming the former is more likely to be accurate and authoritative. This categorization and subsequent scoring ensure that conflict resolution module 108 consistently utilizes the most reliable information when generating responses to user queries, thereby enhancing the overall accuracy and trustworthiness of the outputs.

At 504, conflict resolution module 108 stores the verification information in the knowledge database. In some aspects, the verification information further comprises an external opinion generated by one or more of: a large language model, an expert, a third-party entity that performs fact checks.

At 506, conflict resolution module 108 receives a user query (e.g., user query 112) for the machine learning model (e.g., large language model 114).

At 508, conflict resolution module 108 identifies, in the knowledge database, two or more statements related to the user query. For example, user query 112 may request information about when a particular book was published. Document 102*a* and document 102*b* may include information about said book. One statement may be pulled from document 102*a* and another conflicting statement may be pulled from document 102*b*.

At 510, conflict resolution module 108 detects conflicting factual data in each of the two or more statements. For example, document 102*a* may indicate, in a statement, a publication date of Oct. 10, 2024 and document 102*b* may indicate, in a conflicting statement, a publication date of Oct.

11, 2024. Conflict resolution module 108 may conclude that these two information values do not match.

In some aspects, detecting the conflicting factual data comprises executing a conflict-checking machine learning model (e.g., conflict ML model 306) configured to compare two or more information values about a matching concept and determine that the two or more information values do not correspond.

In some aspects, training the conflict-checking machine learning model, such as conflict ML model 306, involves various steps to ensure it effectively detects conflicting factual data. Initially, a training dataset may curated, containing numerous examples of documents with both consistent and conflicting information values related to matching concepts. This training dataset may be labeled to indicate which information values correspond correctly and which do not. Conflict ML model 306 may then be trained using supervised learning techniques, where it learns to identify patterns and discrepancies in the data by analyzing features such as source credibility, publication dates, and content consistency. During training, conflict ML model 306 is exposed to various scenarios where conflict ML model 306 must compare information values and determine their correspondence, receiving feedback to refine its decision-making process. In some aspects, techniques such as cross-validation and hyperparameter tuning may be employed to optimize the model's performance, ensuring conflict ML model 306 generalizes well to new, unseen data. Additionally, conflict ML model 306 may incorporate natural language processing (NLP) capabilities to understand the context and semantics of the information values, further enhancing its ability to detect conflicts accurately.

At 512, conflict resolution module 108 assigns a respective comprehension level to each of the two or more statements based at least on respective verification information associated with each document corresponding to the two or more statements. The comprehension level is a quantitative measure (e.g., a fraction, an integer, a percentage, a value from 0-1, etc.) or a qualitative measure (e.g., low, medium, high, etc.) assigned to each statement and/or document by the conflict resolution module 108, reflecting the statement's and/or document's reliability and trustworthiness based on its verification information.

In some aspects, assigning the respective comprehension level to each of the two or more statements comprises executing a confidence-evaluating machine learning model (accuracy ML model 305) configured to generate a confidence score (i.e., the comprehension level) based on input verification information of a given document. For example, accuracy ML model 305 processes input verification information, such as the document's source identifier, creation date, verification category, and any external opinions or reviews. For example, statement(s) of a peer-reviewed scientific article may receive a high comprehension level of 0.95, indicating strong reliability, while statement(s) of a blog post with anecdotal evidence may receive a lower score of 0.65. The model 305 employs algorithms that weigh these factors, using techniques like feature extraction and normalization to ensure that each aspect of the verification information contributes appropriately to the final score.

In some aspects, a given comprehension level is associated with the creation time such that more recently created documents are deemed more reliable than older created documents.

At 514, conflict resolution module 108 provides at least the conflicting factual data and the respective comprehension level of each of the two or more statements to the machine learning model for generating a response to the user query.

In some aspects, the response further describes the two or more statements and the respective verification information associated with each document corresponding to the two or more statements, and provides an indication that the two or more statements provide conflicting factual data for the user query.

For instance, if a statement of document 1 has a comprehension level of 0.90 and a statement of document 2 has a score of 0.70, conflict resolution module 108 will lean towards the information from document 1 as the more reliable document. Conflict resolution module 108 may pass the information from document 1 to the machine learning model (e.g., LLM 114), or may pass information from both documents to the machine learning model. In the latter situation, LLM 114 is designed to transparently communicate the presence of conflicting data to the user. LLM 114 achieves this by incorporating a summary of the verification information, such as the source and publication date, alongside the response. This summary provides context, helping the user understand the basis of the information presented. For example, the response may include a note stating, "The publication date of the book is reported as 1995 by a national library record (comprehension level: 0.90) and as 1996 by an online database (comprehension level: 0.70)." This approach not only delivers a well-informed answer but also maintains user trust by acknowledging and explaining the discrepancies in the data.

In some aspects, conflict resolution module 108 further adjusts the knowledge database based on a comparison of the respective comprehension level of each of the two or more statements. Suppose a first comprehension level is assigned to a first statement providing a first information value of the conflicting factual data, and a second comprehension level is assigned to a second statement providing a second information value of the conflicting factual data. In some aspects, in response to determining that the first comprehension level is greater than the second comprehension level, conflict resolution module 108 adjusts the knowledge database by replacing the second information value with the first information value (e.g., replacing a publication date in the less reliable document with a publication data from a more reliable source). In some aspects, in response to determining that the first comprehension level is greater than the second comprehension level, conflict resolution module 108 adjusts the knowledge database by modifying the second information value to include the first information value. For example, a second publication date may be added to the document that is the less reliable source. In this case, conflict resolution module 108 may cite the second publication date and indicate, for any data retrieval performed by LLM 114, that the second publication date is likely more accurate.

In some aspects, conflict resolution module 108 receives a new document for inclusion in the knowledge database. Conflict resolution module 108 assigns new verification information to the new document and identifies a plurality of information values in the new document.

In response to detecting a conflict between at least one of the plurality of information values and an existing information value in the knowledge database, conflict resolution module 108 determines and compares respective comprehension levels of statements in the new document and a source document of the existing information value. Conflict resolution module 108 then adjusts the knowledge database based on a comparison of the respective comprehension levels.

At this stage, the conflict resolution module 108 employs a detailed algorithm to handle the integration of the new document into the knowledge database. Upon detecting a conflict between an information value from the new document and an existing value, the module initiates a comparative analysis of their respective comprehension levels. This process involves the accuracy ML model 305, which evaluates the verification information of both the new and existing documents to generate their comprehension levels. For example, if the new document is a recent government report and has statements with a comprehension level of 0.92, and the existing document is an older news article with statements with a score of 0.75, the module will prioritize the information from the government report. The adjustment process may involve replacing the existing information value with the new one or updating the database to reflect the most reliable data. This ensures that the knowledge database remains current and accurate, leveraging the most credible sources available. In some aspects, conflict resolution module 108 logs all adjustments, maintaining a record of changes for future reference and transparency, which is crucial for auditing and improving the system's conflict resolution strategies.

Figure 6:
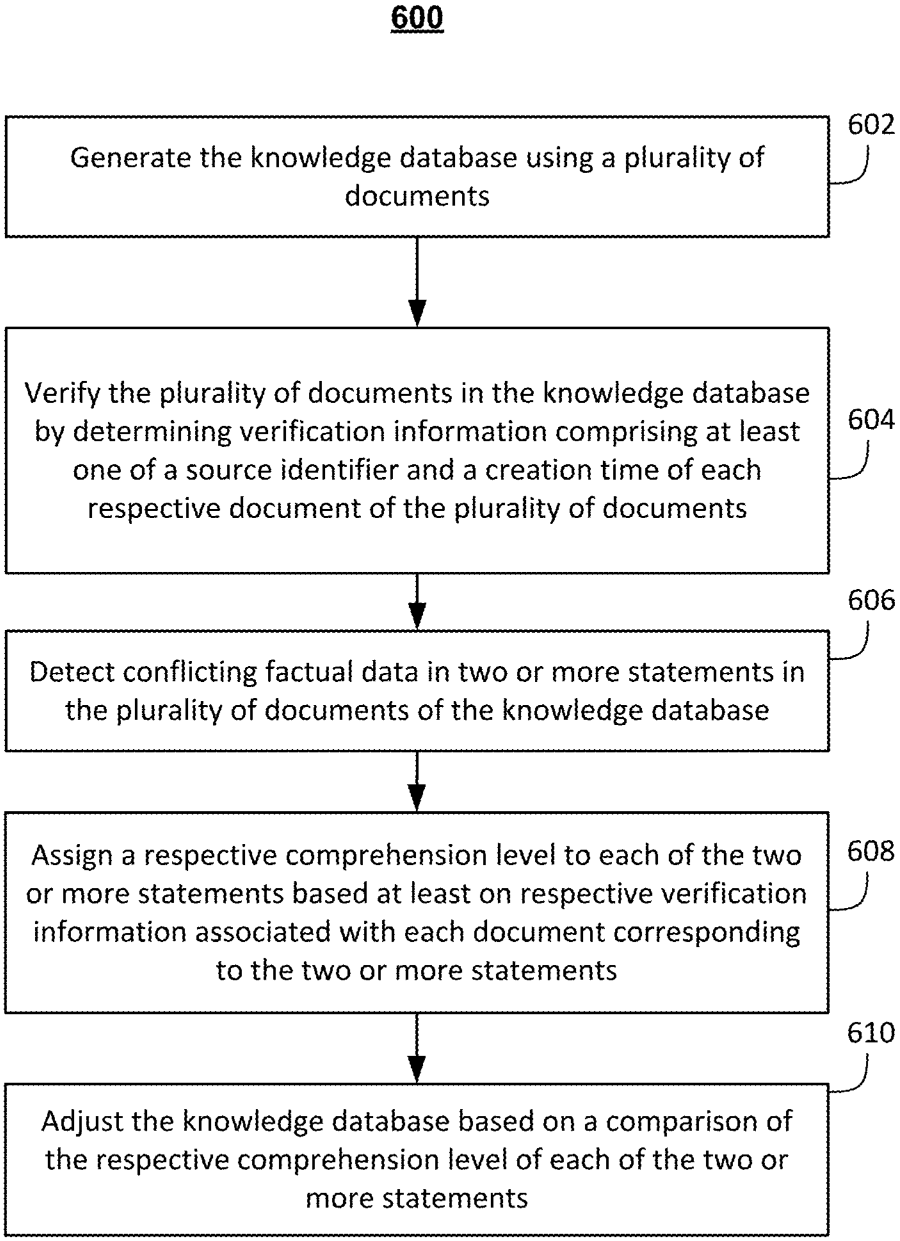
FIG. 6 illustrates a flow diagram of a method for managing conflicting statements in a knowledge database utilized by a machine learning model for responding to user queries.

FIG. 6 is a flow diagram illustrating method 600 for managing conflicting statements in a knowledge database utilized by a machine learning model for responding to user queries. It should be noted that all details described previously are applicable to method 600. Unlike method 500 where conflict checks are triggered in response to a user query, in method 600, conflict checks are performed when the knowledge database is being generated.

At 602, conflict resolution module 108 generates the knowledge database 106 using a plurality of documents (e.g., 102*a*, 102*b*, etc.).

At 604, conflict resolution module 108 verifies the plurality of documents in the knowledge database 106 by determining verification information (e.g., 104*a*, 104*b*, etc.) comprising at least one of a source identifier and a creation time of each respective document of the plurality of documents.

At 606, conflict resolution module 108 detects conflicting factual data in two or more statements of the knowledge database 106 (e.g., document 102*a* and document 102*b* have conflicting data based on a routine scan performed by conflict resolution module 108).

At 608, in response to detecting the conflicting factual data, conflict resolution module 108 assigns a respective comprehension level to each of the two or more statements based at least on respective verification information associated with each document corresponding to the two or more statements.

In some aspects, conflict resolution module 108 assigns the respective comprehension level to each of the two or more statements comprises executing a confidence-evaluating machine learning model configured to generate a comprehension level based on input verification information of a given document.

In some aspects, detecting the conflicting factual data comprises executes a conflict-checking machine learning model configured to compare two or more information values about a matching concept and determine that the two or more information values do not correspond.

At 610, conflict resolution module 108 adjusts the knowledge database 106 based on a comparison of the respective comprehension level of each of the two or more statements.

In some aspects, conflict resolution module 108 further executes the machine learning model (e.g., LLM 114) to generate responses to user queries based on the adjusted knowledge database.

In some aspects, conflict resolution module 108 receives a new document for inclusion in the knowledge database. Conflict resolution module 108 assigns new verification information to the new document. Conflict resolution module 108 identifies a plurality of information values in the new document. In response to detecting a conflict between at least one of the plurality of information values and an existing information value in the knowledge database, conflict resolution module 108 determines and compares respective comprehension levels of the new document and a source document of the existing information value. Conflict resolution module 108 further readjusts the adjusted knowledge database based on a comparison of the respective comprehension levels.

Figure 7:
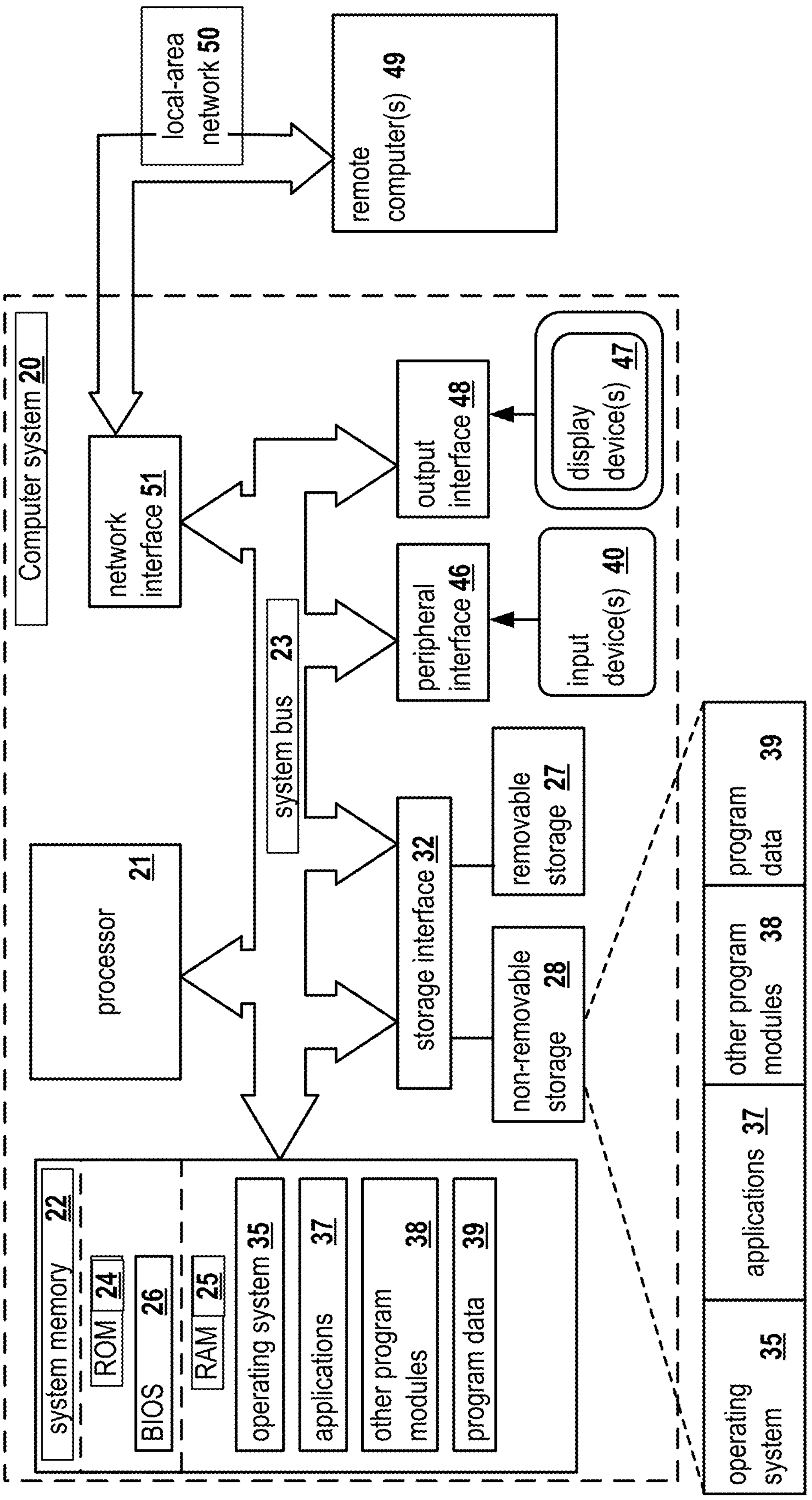
FIG. 7 presents an example of a general-purpose computer system on which aspects of the present disclosure can be implemented.

FIG. 7 is a block diagram illustrating a computer system 20 on which aspects of systems and methods for managing and verifying information within a knowledge model may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-6 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort may be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for managing conflicting statements in a knowledge database utilized by a machine learning model for responding to user queries, the method comprising:

executing a parsing machine learning model on each respective document of a plurality of documents in the knowledge database to identify a plurality of concepts in each respective document and to assign respective information values from each respective document to each of the plurality of concepts;

executing a verification machine learning model on each respective document of the plurality of documents to determine verification information comprising a verification category and a creation date of each respective document;

storing the verification information in the knowledge database;

receiving a user query for the machine learning model;

identifying, in the knowledge database, two or more statements, in the plurality of documents, related to the user query;

in response to detecting conflicting factual data in the two or more statements, executing an accuracy machine learning model configured to assign a respective comprehension level to each of the two or more statements based at least on respective verification information associated with each document corresponding to the two or more statements; and providing at least the conflicting factual data and the respective comprehension level of each of the two or more statements to the machine learning model for generating a response to the user query; and generating an adjusted knowledge database based on a comparison of the respective comprehension level of each of the two or more statements, wherein the adjusted knowledge database resolves conflicting information by modifying information values associated with a lower comprehension level to correspond to information values associated with a higher comprehension level.

2. The method of claim 1, wherein the machine learning model is comprised in a large language model (LLM) service.

3. The method of claim 1, wherein the knowledge database is one of: a Retrieval-Augmented Generation (RAG) database, a knowledge graph, an education platform.

4. The method of claim 1, wherein detecting the conflicting factual data comprises executing a conflict-checking machine learning model configured to compare two or more information values about a matching concept and determine that the two or more information values do not correspond, wherein the conflict-checking machine learning model incorporates natural language processing (NLP) capabilities to understand context and semantics of the information values.

5. The method of claim 1, wherein assigning the respective comprehension level to each of the two or more statements comprises executing a confidence-evaluating machine learning model configured to generate a comprehension level based on input verification information of a given statement.

6. The method of claim 1, wherein the response further describes the two or more statements and the respective verification information associated with each document corresponding to the two or more statements, and provides an indication that the two or more statements provide conflicting factual data for the user query.

7. The method of claim 1, further comprising further adjusting the adjusted knowledge database based on detecting additional conflicting information values in the adjusted knowledge database.

8. The method of claim 7, wherein a first comprehension level is assigned to a first statement providing a first information value of the conflicting factual data, and a second comprehension level is assigned to a second statement providing a second information value of the conflicting factual data, wherein adjusting the knowledge database further comprises:

in response to determining that the first comprehension level is greater than the second comprehension level, replacing the second information value with the first information value.

9. The method of claim 7, wherein a first comprehension level is assigned to a first statement providing a first information value of the conflicting factual data, and a second comprehension level is assigned to a second statement providing a second information value of the conflicting factual data, wherein adjusting the knowledge database further comprises:

in response to determining that the first comprehension level is greater than the second comprehension level, modifying the second information value to include the first information value.

10. The method of claim 1, further comprising:

receiving a new document for inclusion in the knowledge database;

assigning new verification information to the new document;

identifying a plurality of information values in the new document;

in response to detecting a conflict between at least one of the plurality of information values and an existing information value in the knowledge database, determining and comparing respective comprehension levels of statements in the new document and a source document of the existing information value; and adjusting the knowledge database based on a comparison of the respective comprehension levels.

11. The method of claim 1, wherein a given comprehension level is associated with the creation time such that more recently created documents are deemed more reliable than older created documents.

12. The method of claim 1, wherein the verification information further comprises an external opinion generated by one or more of: a large language model, an expert, a third-party entity that performs fact checks.

13. The method of claim 1, wherein the comprehension level is a confidence score.

14. A system for managing conflicting statements in a knowledge database utilized by a machine learning model for responding to user queries, comprising:

at least one memory;

at least one hardware processor coupled with the at least one memory and configured, individually or in combination, to:

execute a parsing machine learning model on each respective document of a plurality of documents in the knowledge database to identify a plurality of concepts in each respective document and to assign respective information values from each respective document to each of the plurality of concepts;

execute a verification machine learning model on each respective document of the plurality of documents to determine verification information comprising a verification category and a creation date of each respective document;

store the verification information in the knowledge database;

receive a user query for the machine learning model;

identify, in the knowledge database, two or more statements, in the plurality of documents, related to the user query;

in response to detecting conflicting factual data in the two or more statements, execute an accuracy machine learning model configured to assign a respective comprehension level to each of the two or more statements based at least on respective verification information associated with each document corresponding to the two or more statements; and provide at least the conflicting factual data and the respective comprehension level of each of the two or more statements to the machine learning model for generating a response to the user query; and generate an adjusted knowledge database based on a comparison of the respective comprehension level of each of the two or more statements, wherein the adjusted knowledge database resolves conflicting information by modifying information values associated with a lower comprehension level to correspond to information values associated with a higher comprehension level.

15. The system of claim 14, wherein the machine learning model is comprised in a large language model (LLM) service.

16. The system of claim 14, wherein the knowledge database is one of: a Retrieval-Augmented Generation (RAG) database, a knowledge graph, an education platform.

17. The system of claim 14, wherein the at least one hardware processor is further configured to detect the conflicting factual data by executing a conflict-checking machine learning model configured to compare two or more information values about a matching concept and determine that the two or more information values do not correspond, wherein the conflict-checking machine learning model incorporates natural language processing (NLP) capabilities to understand context and semantics of the information values.

18. The system of claim 14, wherein the at least one hardware processor is further configured to assign the respective comprehension level to each of the two or more statements by executing a confidence-evaluating machine learning model configured to generate a comprehension level based on input verification information of a given document.

19. The system of claim 14, wherein the response further describes the two or more statements and the respective verification information associated with each document corresponding to the two or more statements, and provides an indication that the two or more statements provide conflicting factual data for the user query.

20. The system of claim 14, wherein the at least one hardware processor is further configured to further adjust the adjusted knowledge database based on detecting additional conflicting information values in the adjusted knowledge database.

21. A non-transitory computer readable medium storing thereon computer executable instructions for managing conflicting statements in a knowledge database utilized by a machine learning model for responding to user queries, including instructions for:

executing a parsing machine learning model on each respective document of a plurality of documents in the knowledge database to identify a plurality of concepts in each respective document and to assign respective information values from each respective document to each of the plurality of concepts;

executing a verification machine learning model on each respective document of the plurality of documents to determine verification information comprising a verification category and a creation date of each respective document;

storing the verification information in the knowledge database;

receiving a user query for the machine learning model;

identifying, in the knowledge database, two or more statements, in the plurality of documents, related to the user query;

in response to detecting conflicting factual data in the two or more statements, executing an accuracy machine learning model configured to assign a respective comprehension level to each of the two or more statements based at least on respective verification information associated with each document corresponding to the two or more statements; and providing at least the conflicting factual data and the respective comprehension level of each of the two or more statements to the machine learning model for generating a response to the user query; and generating an adjusted knowledge database based on a comparison of the respective comprehension level of each of the two or more statements, wherein the adjusted knowledge database resolves conflicting information by modifying information values associated with a lower comprehension level to correspond to information values associated with a higher comprehension level.

* * * * *